(12) United States Patent
Bhattacharyya et al.

(10) Patent No.: US 11,012,306 B2
(45) Date of Patent: May 18, 2021

(54) AUTONOMOUS DATACENTER MANAGEMENT PLANE

(71) Applicant: Cisco Technology, Inc., San Jose, CA (US)

(72) Inventors: Sayantan Bhattacharyya, West Bengal (IN); SriSai Ganesh V Venkatramani, Bangalore (IN); Yogindar Das Yasodhar, Karnataka (IN); Harshad Prabhu, Bangalore (IN)

(73) Assignee: CISCO TECHNOLOGY, INC., San Jose, CA (US)

(*) Notice: Subject to any disclaimer, the term of this patent is extended or adjusted under 35 U.S.C. 154(b) by 204 days.

(21) Appl. No.: 16/138,273

(22) Filed: Sep. 21, 2018

(65) Prior Publication Data

US 2020/0099584 A1 Mar. 26, 2020

(51) Int. Cl.
| | | |
|---|---|---|
| *G06F 15/173* | (2006.01) |
| *H04L 12/24* | (2006.01) |
| *G06F 11/30* | (2006.01) |
| *H04L 12/26* | (2006.01) |
| *G06F 8/65* | (2018.01) |

(52) U.S. Cl.
CPC .......... *H04L 41/0869* (2013.01); *G06F 8/65* (2013.01); *G06F 11/3006* (2013.01); *G06F 11/3089* (2013.01); *H04L 41/0853* (2013.01); *H04L 41/12* (2013.01); *H04L 43/10* (2013.01); *H04L 41/0886* (2013.01)

(58) Field of Classification Search
CPC ............ G06F 11/0709; G06F 11/0748; G06F 11/079; G06F 11/0793; G06F 8/654; H04L 41/0869
See application file for complete search history.

(56) References Cited

U.S. PATENT DOCUMENTS

| 9,298,524 B2 | 3/2016 | Lewis | |
|---|---|---|---|
| 2008/0205286 A1* | 8/2008 | Li | ........................... H04L 1/243 370/249 |
| 2009/0077478 A1* | 3/2009 | Gillingham | ......... H04L 41/0883 715/763 |
| 2012/0166390 A1* | 6/2012 | Merriman | ........... G06F 16/2365 707/613 |

(Continued)

*Primary Examiner* — Brian Whipple
*Assistant Examiner* — Gregory P Tolchinsky
(74) *Attorney, Agent, or Firm* — Edell, Shapiro & Finnan, LLC

(57) ABSTRACT

Presented herein are methodologies for managing servers in a datacenter or cloud service environment. A method includes sending, from a first baseboard management controller (BMC), to other BMCs in a network, a first message indicating a desire to establish a master-slave relationship; receiving a response from a second BMC from among the other BMCs, the response indicating an ability to function as a master in the master-slave relationship; sending, from the first BMC, a second message to the second BMC confirming establishment of the master-slave relationship between the second BMC and the first BMC; sending, from the first BMC to the second BMC, a request for configuration information; and in response to the request for configuration information, receiving, from the second BMC, configuration profile data representative of a configuration of a server, which is controlled by the second BMC.

18 Claims, 5 Drawing Sheets

(56) References Cited

U.S. PATENT DOCUMENTS

| | | | |
|---|---|---|---|
| 2013/0278412 A1* | 10/2013 | Kelly | G08B 26/00 340/539.1 |
| 2014/0198778 A1* | 7/2014 | Fraser | H04W 4/10 370/336 |
| 2014/0229758 A1* | 8/2014 | Richardson | G06F 11/2007 714/4.11 |
| 2016/0099886 A1* | 4/2016 | Rao | H04L 47/826 709/226 |
| 2016/0203017 A1* | 7/2016 | Davenport | G06F 16/183 718/1 |
| 2016/0241432 A1* | 8/2016 | Vidyadhara | H04L 61/1511 |
| 2017/0102952 A1* | 4/2017 | Khemani | G06F 13/4282 |
| 2017/0139797 A1* | 5/2017 | Wang | G06F 11/3055 |
| 2017/0206110 A1* | 7/2017 | Huang | G06F 9/5088 |
| 2017/0262209 A1* | 9/2017 | Wang | G06F 13/1663 |
| 2017/0357515 A1* | 12/2017 | Bower, III | G06F 9/4406 |
| 2018/0019869 A1* | 1/2018 | Savage | H04L 9/0833 |
| 2018/0039552 A1* | 2/2018 | Moskowiz | G06F 11/0757 |
| 2018/0074984 A1* | 3/2018 | Olarig | G06F 13/36 |
| 2018/0157509 A1* | 6/2018 | Suryanarayana | G06F 9/45558 |
| 2018/0278468 A1* | 9/2018 | Rao | H04L 41/044 |
| 2018/0314507 A1* | 11/2018 | Chien | G06F 8/65 |
| 2019/0394266 A1* | 12/2019 | Fukuyama | H04L 67/1097 |
| 2020/0019654 A1* | 1/2020 | Gou | G06F 30/337 |
| 2020/0050448 A1* | 2/2020 | Gupta | G06F 8/71 |

* cited by examiner

… (1)

AUTONOMOUS DATACENTER MANAGEMENT PLANE

TECHNICAL FIELD

The present disclosure relates to datacenter server and cloud service management.

BACKGROUND

Effective server provisioning, monitoring and management are some of the most challenging tasks faced by datacenter administrators. Over the years, as the datacenter has become more critical for business success, an increasing number of "north-bound" management interfaces have been implemented, either at the cost of extra hardware (in the form of, e.g., a Unified Computing System (UCS) Manager and associated Fabric Interconnect switch) or extra software (in the form of, e.g., centralized management software for standalone rack servers, and storage servers located across one or more sites). As is often the case, cloud and datacenter scale users may be reluctant to make expenditures for extra hardware and software. Moreover, the foregoing "north-bound" solutions tend to centralize the provisioning, monitoring and management of a datacentre, leading to a possible single point of failure.

DESCRIPTION OF EXAMPLE EMBODIMENTS

Overview

Presented herein are techniques for a distributed storage system implementing erasure coding. A method may include sending, from a first baseboard management controller (BMC), to other BMCs in a network, a first message indicating a desire to establish a master-slave relationship; receiving a response from a second BMC from among the other BMCs, the response indicating an ability to function as a master in the master-slave relationship; sending, from the first BMC, a second message to the second BMC confirming establishment of the master-slave relationship between the second BMC and the first BMC; sending, from the first BMC to the second BMC, a request for configuration information; and in response to the request for configuration information, receiving, from the second BMC, configuration profile data representative of a configuration of a server, which is controlled by the second BMC.

A device or apparatus is also described. The device may include an interface unit configured to enable network communications; a memory; and one or more processors coupled to the interface unit and the memory, and configured to: send, from a first baseboard management controller (BMC), to other BMCs in a network, a first message indicating a desire to establish a master-slave relationship; receive a response from a second BMC from among the other BMCs, the response indicating an ability to function as a master in the master-slave relationship; send, from the first BMC, a second message to the second BMC confirming establishment of the master-slave relationship between the second BMC and the first BMC; send, from the first BMC to the second BMC, a request for configuration information; and in response to the request for configuration information, receive, from the second BMC, configuration profile data representative of a configuration of a server, which is controlled by the second BMC.

EXAMPLE EMBODIMENTS

At a high level, disclosed herein is an application layer protocol that interconnects respective baseboard management controllers (BMCs) of individual servers in a datacenter, and indirectly interconnects resultant interconnected BMCs with a cloud service application, which may be configured to, e.g., seed a given BMC, so that the given BMC can then cause seeded information to proliferate to other interconnected BMCs. The protocol is referred to herein as the "Hello BMC Protocol" or "the protocol" and comprises a mix of broadcast and unicast packet exchanges in a layer-3 broadcast domain or subnet. As will become evident to one of ordinary skill in the art, the Hello BMC Protocol adds unique intelligence in the data center management plane. In an embodiment, the protocol is by default ENABLED on a factory system so that a given BMC automatically engages with other BMCs, and perhaps directly with the cloud service application, upon power up in a network.

Figure 1:
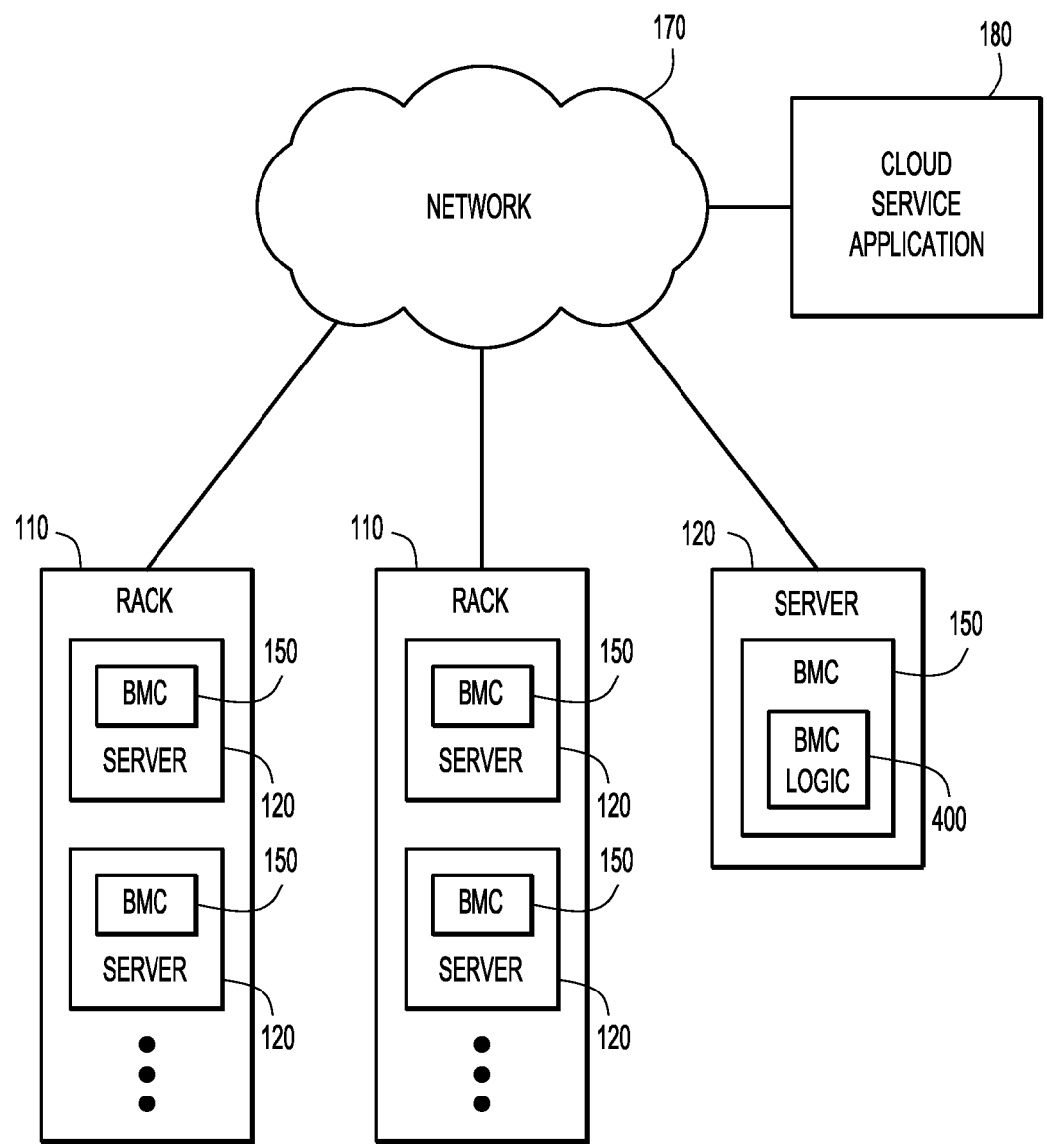
FIG. 1 depicts a network of servers in a datacenter that include respective baseboard management controllers (BMCs) that operate in accordance with an example embodiment.

FIG. 1 depicts a network of servers in a datacenter 100 that include respective baseboard management controllers (BMCs) that operate in accordance with an example embodiment, i.e., the Hello BMC Protocol. Specifically, server racks 110 in datacenter 100 comprise physical servers 120. Each server may host multiple virtual machines (not expressly shown). Each server 120 includes a baseboard management controller (BMC) 150. In general, a BMC is a microcontroller embedded on a motherboard of a computer, such as server 120, and manages the interface between system-management software and platform hardware. As will be explained in detailed herein, the BMC in accordance with the disclosed embodiments includes BMC logic 400, which is configured to operate in accordance with the Hello BMC protocol. As further shown in FIG. 1, the racks 110, and servers 120 housed therein, are interconnected by a network 170, such a local area network, e.g., Ethernet.

At a high level, the protocol enables each BMC 150 to discover its compatible nodes present in the subnet. The protocol further is configured to convert compatible systems (servers 120) present in the network into an organized hierarchy or tree of master/slaves. Respective master BMCs 150 then maintain a live child matrix under their subtrees, using heartbeats. In this way, the tree is easily updated at any time. In one embodiment, a cloud service application 180 may engage with a single BMC 150 to seed that BMC with desired information or data and the protocol is configured to then proliferate that seeded information or data to all BMCs 150 in the hierarchy. The cloud service application 180 may host, for example, customer service level agreements (SLAs) that a customer can modify, and thus trigger the cloud service application 180 to seed one of the BMCs accordingly.

BMC Discovery Phase

Figure 2:
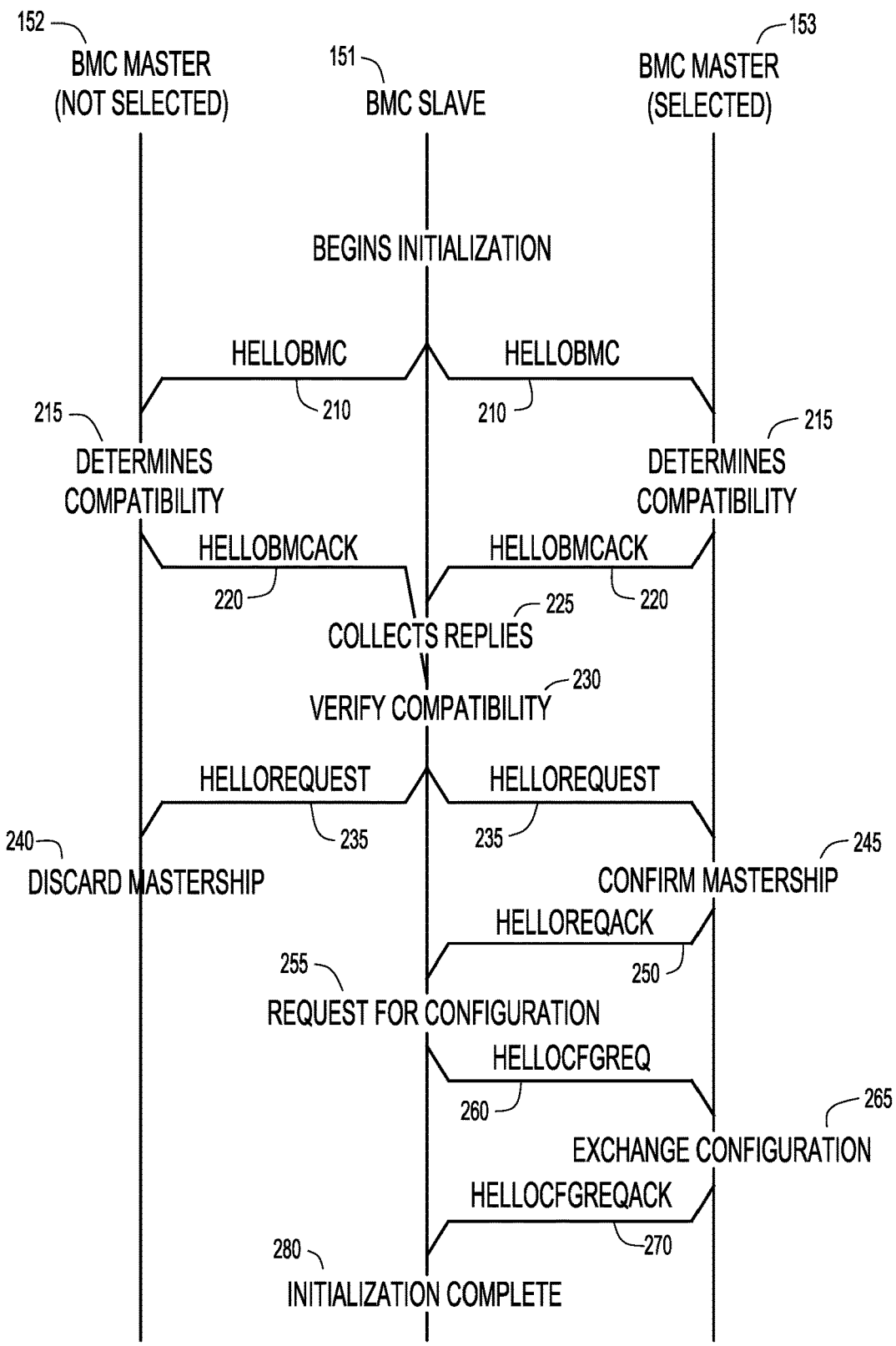
FIG. 2 shows a ladder diagram that details a BMC discovery phase in accordance with an example embodiment.

FIG. 2 shows a ladder diagram that details a BMC discovery phase in accordance with an example embodiment. This phase comprises several communication exchanges, or message or packet sequences in accordance with the protocol. The several messages or packets, their contents, and sequences are explained below. A primary, and preliminary, objective of the discovery phase is to establish a master-slave relationship among several BMCs 150 in a given subnet. The messages and logic employed for message exchange is embodied in BMC logic 400 hosted by each BMC 150. In FIG. 2, BMCs 151, 152 and 153 are depicted, and those skilled in the art will appreciate that such BMCs are effectively the same as BMCs 150 in FIG. 1, but are referenced with different reference numerals for purposes of explaining the embodiments disclosed herein.

HELLOBMC: For each server 120 in the datacenter 100, once standby power is turned on, a BMC 150 is "up" and immediately obtains an IP address through DHCP. The BMC 150 of a server 120 then performs a Discovery-Boot of the system to identify the set of hardware components present in the server 120. Once the hardware is discovered by a given BMC, BMC 151 in FIG. 2 for example, starts advertising its properties through a L3 broadcast packet, named "HELLOBMC" 210. This packet contains parameters to uniquely identify each server 120 (in this case the server associated with BMC 151) and its capabilities and compatibility parameters. The contents of an example HELLOBMC packet includes:

Server PID—Unique identity of the system in the subnet.

BMC+BIOS Firmware version—Software version of BMC & BIOS.

Hardware Inventory Summary—Brief inventory of HW including model numbers, etc.

Persistence database revision number—Configuration database revision number, which mays set to ZERO/INVALID on factory default systems.

Positioning Tree Level in the topology—The relative positioning level in the tree topology of the BMCs, 0xFFFF for new node.

At boot up, each BMC 150 advertises this packet at regular intervals 210, until it receives a sufficient number of response packets (HELLOBMCACKs) from other nodes (server/BMCs) 152, 153 in the subnet and until, in the depicted case, BMC 151 finds its master/slave relationship finalized in the network.

HELLOBMCACK: Other BMCs 152, 153 (which have already stabilized in the network), after receiving the BMC 151 advertisement, analyze their self-compatibility 215 with the new node 151 and send a response packet, HELLOBMCACK packet 220, to BMC 151. In one embodiment, a HELLOBMCACK packet 220 is sent when:

The responding server has the same BMC+BIOS firmware version;

The responding server is compatible hardware-wise with the new node; and

The responding BMC's Persistent Database Revision Number is VALID (NONZERO) and is Higher Than or Equal To the new node's Persistent Database Revision Number.

The content of a HELLOBMCACK packet is the same as that in HELLOBMC; except that:

It is a new packet type; and

It is a unicast packet to the new BMC only.

HELLOBMCACK may also include one extra field called Configuration Compatibility TAG—which serves as a brief profile tag for the configuration of the sending server, e.g. Configuration Profile for Servers having at least 32 GB of RAM and 24 HDDs.

In order to control the number of nodes responding with HELLOBMCACK packets 220, the number of nodes that a given BMC can serve may be restricted (e.g., to 4). As such, only BMCs that have not reached such a limit will respond.

BMC 151 collects the HELLOBMCACK replies at 225 and, at 230, verifies its compatibility with BMCs 152, 153. Compatibility verification, and thus selection as a master, may be performed as follows:

Select only the set of BMCs, whose HELLOBMCACK packets indicate the same BMC+BIOS firmware version as the local node 151;

Of the BMCs 152, 153 having the same BMC+BIOS firmware version, out of them, further select the ones having the same hardware Inventory and Compatibility TAG;

Thereafter, select the BMCs 152, 153 which have the Highest Persistent Database Revision Number. Such BMCs will have the maximum available configuration, i.e., the most recently-seeded configuration information;

If, after the foregoing steps, there is more than one BMC left (e.g., both 152 and 153 remain), BMC 151 may select the BMC(s) with lowest Tree Level position in the network; and If there is still more than one BMC remaining, then BMC 151 may apply arbitration logic (e.g., lowest IP address) to elect one, and only one BMC as its master, and discard the others.

Discarding mastership 240 and confirming mastership 245 is implemented by sending a HELLOREQUEST packet 235. That is, once BMC 151 has chosen its master, BMC 151 generates a HELLOREQUEST message 235, which is again a subnet broadcast message. The HELLOREQUEST packet 235 carries the Elected Server PID, which indicates to the elected BMC 153, in this case, that it is now a BMC master with respect to BMC slave 151. The HELLOREQUEST message 235 also acts as NAK (negative acknowledgement) to all other non-elected nodes in the subnet (in this case BMC 152), so that they can discard their context for BMC 151.

HELLOREQACK: Once an Elected Master BMC 153 receives the HELLOREQUEST packet confirming mastership 245, it responds back with a unicast HELLOREQACK 250, which finalizes the Master/Slave relationship.

HELLOCFGREQ: In response to the HELLOREQACK 250 packet, BMC (Slave) 151 requests for configuration 255 by sending a HELLOCFGREQ message 260 to obtain the configuration of the server with which BMC 153 is associated. The configuration of the server is reflected by its Persistent Database Revision Number.

At 265, configuration information is exchanged via a HELLOCFGREQACK packet 270. In turn, BMC (slave) 151 will apply the same configuration to itself, which will also cause its Persistent Database Revision Number to be updated to the same number as that of BMC (Master) 153. The Persistent Database Revision Number may be made persistent in the system so that, in the case of BMC reboot, it is possible to skip configuration synchronization, and move directly to performing discovery to find/re-establish tree positioning.

A failure encountered during any of the exchanges depicted in FIG. 2, may cause the new node (BMC 151) to restart its finite state machine that manages a given protocol process. Also, if a master BMC is pairing with a new BMC, and the new BMC unexpectedly goes offline, timer based mechanisms at the master end can clean up (i.e., eliminate) the client (slave) context after a predetermined period of time Also, in one implementation, the protocol does not implement express NAK messages, as the several ACK messages are configured to confirm the receipt of the request message, but do not necessarily indicate the completion of the actual task. That is, a receiving BMC sends the ACK to acknowledge receipt of a given packet, but may actually choose to delay/queue the requested activity for a later time. Consequently, in an example implementation, for each request packet, a BMC is configured to send an ACK, but need not send any NAKs.

In the event of erroneous messaging, e.g., if a given packet is meant only to pass between a given master/slave pair, but is somehow received by another node in the network, the packet may be dropped at the receiver's end. The sender end's re-transmission timer framework may be used to ensure that the intended recipient ultimately receives the packet.

The protocol described herein is configured to not detrimentally impact the regular operations of the BMCs in terms of performance, etc. That is, heartbeat messaging and other re-transmission timers are set at, e.g., every 30 seconds, which adds very little extra load to the BMC management plane As an example, the protocol may be implemented over UDP, with appropriate protocol level re-transmission at each stage with a robust timer framework.

Post BMC Discovery Phase

Figure 3:
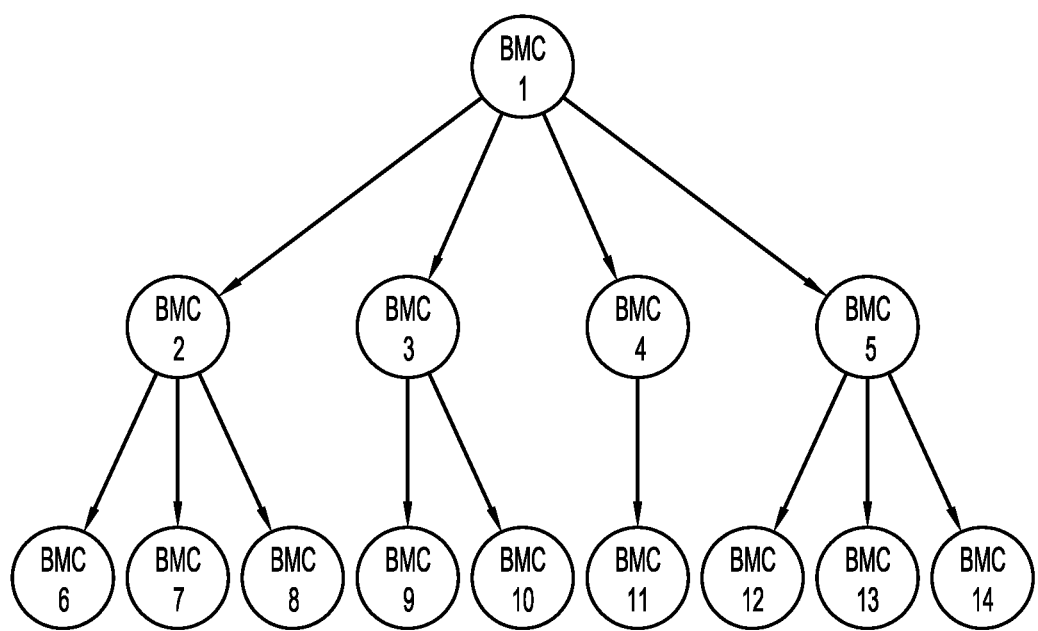
FIG. 3 depicts a BMC hierarchical tree topology after the BMC discovery phase in accordance with an example embodiment.

After BMC discovery and Master/Slave election in a subnet, the resultant network topology of the BMCs logically appears as a tree topology or hierarchy, as shown in FIG. 3, with BMCs 1-14. The tree is an N-ary tree, where N is configurable. The Tree Level Position Data in the network exchanged during BMC discovery helps the tree to fill from the top, level by level. The tree and the Master/Slave relationships are maintained to help distribute the datacenter monitoring of servers among all master BMCs. As a result, the tree does not need any efficient search mechanism, but rather relies on strong links. The following sets of packets are exchanged to track node presence in each subtree.

HELLOPING: Each Slave BMC periodically sends a unicast keep-alive/heartbeat message to its parent/Master BMCs, named HELLOPING. This packet carries the Master/Slave pairing information.

HELLOPINGACK: Each Master BMC responds back to HELLOPING with a unicast acknowledgement back to its Slave. The packet is named HELLOPINGACK. This packet acknowledges the Master/Slave pairing information sent in HELLOPING.

If there is no HELLOPING for a predefined period of time, from any of the slaves, the master BMC 153 can delete the slave 151 from its list of slaves, thereby opening up one slot for a prospective slave in future.

If there is no response for a HELLOPING for a predefined period of time from a master, the slave BMC 151 is configured to reset its topology tree level data to 0xFFFF and re-initiate a HELLOBMC packet 220 to rediscover its position in the network. But, before doing that, slave BMC 151 notifies its entire subtree about this organizational change and breaks its master/slave relationship, which forces all the BMCs in the subtree to enter into a new round of discovery. The two packets below are employed to break a master/slave relationship.

HELLORESTART: Each master BMC, before engaging in a rediscovery in the network, sends a unicast message to each of its slave BMCs notifying the end of the master/slave relationship. The message is named HELLORESTART. This packet, once received by a slave, is first passed to its immediate subtree. The slave then updates its own tree level to 0xFFFF and restarts BMC discovery. Before engaging in a rediscovery, each master BMC may wait for acknowledgement of a HELLORESTART from each of its slaves. This packet typically travels to all leaf nodes of an affected subtree.

HELLORESTARTACK: Each slave BMC, upon receiving a HELLORESTART packet, notifies their own slaves, and restarts BMC discovery. In addition, the slave sends an acknowledgement, HELLORESTARTACK, to its master acknowledging the relationship breakup.

Real Time Configuration Sync

In accordance with the disclosed embodiments, each BMC is equally capable of getting configured in the network. BMC configurations can be classified as non-profile based or private configuration (which are very less in number) and profile based or common configuration that account for the majority of configurations in the system. Private configurations may not affect Persistent Database Revision Number and may not be meant to be synchronized with other BMCs. On the other hand, profile based configurations are meant to be synchronized and are intended to increment Persistent Database Revision Number Significantly, although the BMCs are arranged logically in a tree master/slave hierarchy, when it comes to proliferating data, e.g., a new configuration from cloud service application 180, it is not necessary to identify the root of the tree. A real time configuration change can be pushed from any node (BMC) of the system. When one BMC is seeded with the data (e.g., configuration information), that data is, in turn, propagated through the entire tree to all the nodes in the network both upward and downward through the tree. There are two messages that enable this function:

HELLOCFGUPD: The HELLOCFGUPD packet is a unicast packet that is sent from a BMC to all its slaves, as well as its master. This packet carries the latest Persistent Database Revision Number and the specific configuration in suitable format. Each slave forwards this packet to all its slaves and each master forwards this packet to its master. In this way, the configuration will propagate to the entire network.

HELLOCFGUPDACK: Each BMC, upon receiving HELLOCFGUPD, updates its database with the new configuration and sends a HELLOCFGUPDACK packet to the HELLOCFGUPD sender to acknowledge the same. If any BMC was already at a higher Persistent Database Revision Number (unlikely), that BMC may ignore the packet and send a dummy HELLOCFGUPDACK.

Firmware Management

One of the major tasks in datacenter management is firmware management of the systems. Through UCS's Non-Interactive Host Upgrade Utility (NI-HUU) (available from Cisco Systems, Inc., San Jose, Calif.), one can upgrade an entire "box" (BMC+BIOS+Adapters). IN the context of the disclosed embodiments, a virtual media mapping of the HUU ISO may be setup, and then the NI-HUU triggered. The information can then be propagated to all other nodes using the messages below:

HELLOFWUPD: The HELLOFWUPD packet is a unicast packet that is sent from a BMC to all its slaves, as well as its master. This packet carries the ID of the hardware components that need updating and also the file system share path of the images in suitable format. Each slave will forward this packet to all its slaves and each master will forward this packet to its master. In this way, the configuration will propagate to the entire network.

HELLOFWUPDACK: Each BMC, upon receiving a HELLOFWUPD, starts the firmware update of the mentioned component and unicasts a responsive HELLOFWUPDACK packet to confirm the receipt of the firmware update request. However, the receiving BMC may internally queue the actual update and schedule the same for a later time.

It is also possible, in accordance with the embodiments described herein, to perform Host operating system installation using similar techniques, but instead of relying on a host upgrade utility (HUU), a system configuration utility (SCU) may be used.

Fault Event Monitoring and Software Error Correction

One of the most important reasons for having a tree topology in the described embodiments is to distribute the monitoring task of the network to many nodes, instead of one single endpoint. Each master BMC can register for fault events/traps from its immediate slaves and can perform failure analysis to detect issues that can be fixed by software means, and initiate corrective action to solve the problem, if possible. This approach can help reduce the merchandise return rate of UCS servers. Examples of such scenarios could be Out Of Memory of BMC, or Flash File System Corruption. To initiate such administrative actions, the protocol supports the following action messages:

HELLOACTIONREQ: The Master BMC can instruct its immediate slaves to take certain administrative actions like Host Power Cycle, BMC reboot, Flash Erase, etc. through a HELLOACTIONREQ message. The message is unicast and carries an action-id that maps to each predefined task.

HELLOACTIONREQACK: Each BMC, upon receiving a HELLOACTIONREQ packet, takes the necessary action and responds with a HELLOACTIONREQACK with the status of the action in unicast mode.

Detected errors, which are not correctable through software (i.e., replacement of hardware is needed), may be reported through some sort of messaging mechanism (e.g., email), to persons/systems responsible for the administration of that network/cluster.

Power Budget Maintenance

BMCs 150 can measure and control power utilization of each server 120. The network topology that is enabled by the protocol can help maintain a predetermined power budget of an entire cluster in a distributed manner. For example, if the overall power budget of a server is fed to one of the BMCs (which in turn propagates to all), each master node of any subtree can monitor the power usage of all of its slaves using some messaging as follows:

HELLOENQUIRY: The Master BMC can query its immediate slaves for administrative data such as power usage, CPU usage, etc. through a HELLOENQUIRY message. The message is unicast and carries an enquiry-id that maps to each predefined entity.

HELLOENQUIRYACK: Each BMC, upon receiving a HELLOENQUIRY from a master, responds with a HELLOENQUIRYACK along with the relevant data in unicast mode.

Once the master BMC receives, e.g., the power usage data, it may decide to impose power capping for that node, as may be desired.

Security Aspects

To maintain security, SSL may be employed for data exchanges. For still further security, each protocol packet may be encrypted using a private key of each source BMC and the same can be decrypted by a public key in the target BMC. This can ensure that packets are travelling only between valid endpoints.

Example Use Case—Datacenter Set Up

In a datacenter, when pools of new racks are powered on with standby power, each BMC receives an IP address over DHCP (as DHCP is enabled by default) and performs Discover-Boot to identify self-hardware-inventory. At the same time, each BMC tries to periodically find a master/slave relationship by sending HELLOBMC (as the protocol is enabled by default). But since all the BMCs are at factory default condition, all may have Persistent Database Revision Number as INVALID/ZERO. This will not allow any pairing until at least one BMC obtains a valid configuration. To address this issue, from the DHCP server's IP lease table, a customer can pick any BMC IP and push a set of profiles to that BMC for the first time. This will cause one BMC to have a VALID/NONZERO Persistent Database Revision Number. Eventually this BMC will synchronize with another N BMCs where N is the maximum limit of slave BMCs. Then, those N BMCs will take charge and synchronize more BMCs. In this way, the topology is gradually and seamlessly built.

Figure 4:
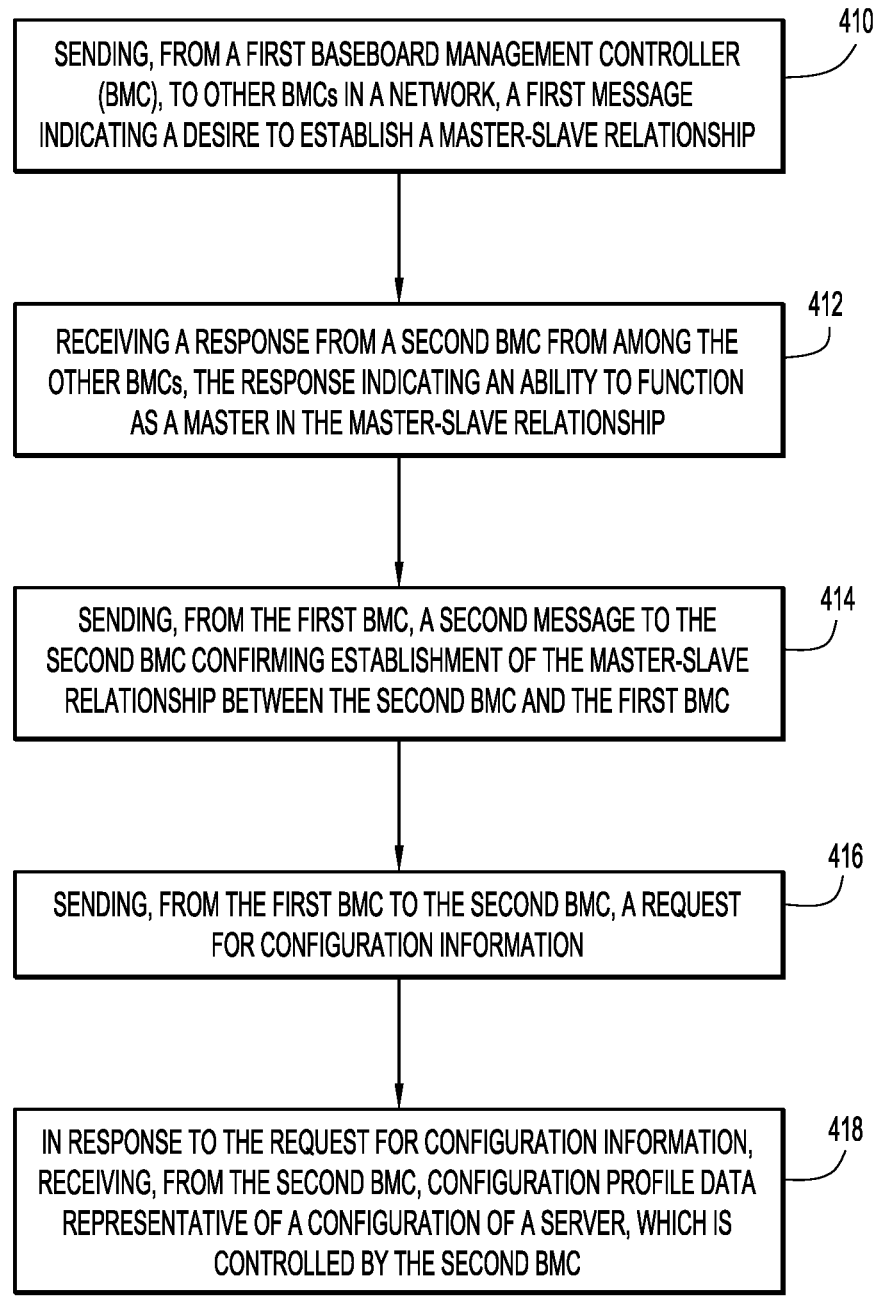
FIG. 4 is a flow chart depicting a series of operations for discovering BMCs in a network in accordance with an example embodiment.

FIG. 4 is a flow chart depicting a series of operations for discovering BMCs in a network in accordance with an example embodiment. The operations of FIG. 4 may be performed by BMC logic 400.

As shown, at 410, an operation includes sending, from a first baseboard management controller (BMC), to other BMCs in a network, a first message indicating a desire to establish a master-slave relationship. At 412, an operation includes receiving a response from a second BMC from among the other BMCs, the response indicating an ability to function as a master in the master-slave relationship. At 414, an operation includes sending, from the first BMC, a second message to the second BMC confirming establishment of the master-slave relationship between the second BMC and the first BMC. At 416 an operation includes sending, from the first BMC to the second BMC, a request for configuration information. And, at 418 an operation includes, in response to the request for configuration information, receiving, from the second BMC, configuration profile data representative of a configuration of a server, which is controlled by the second BMC. Once a plurality of BMCs have discovered each other, and formed a logically tree within a given subnet, one given BMC can then be used to proliferate data to all the other BMCs without a central system having to contact each BMC individually.

Figure 5:
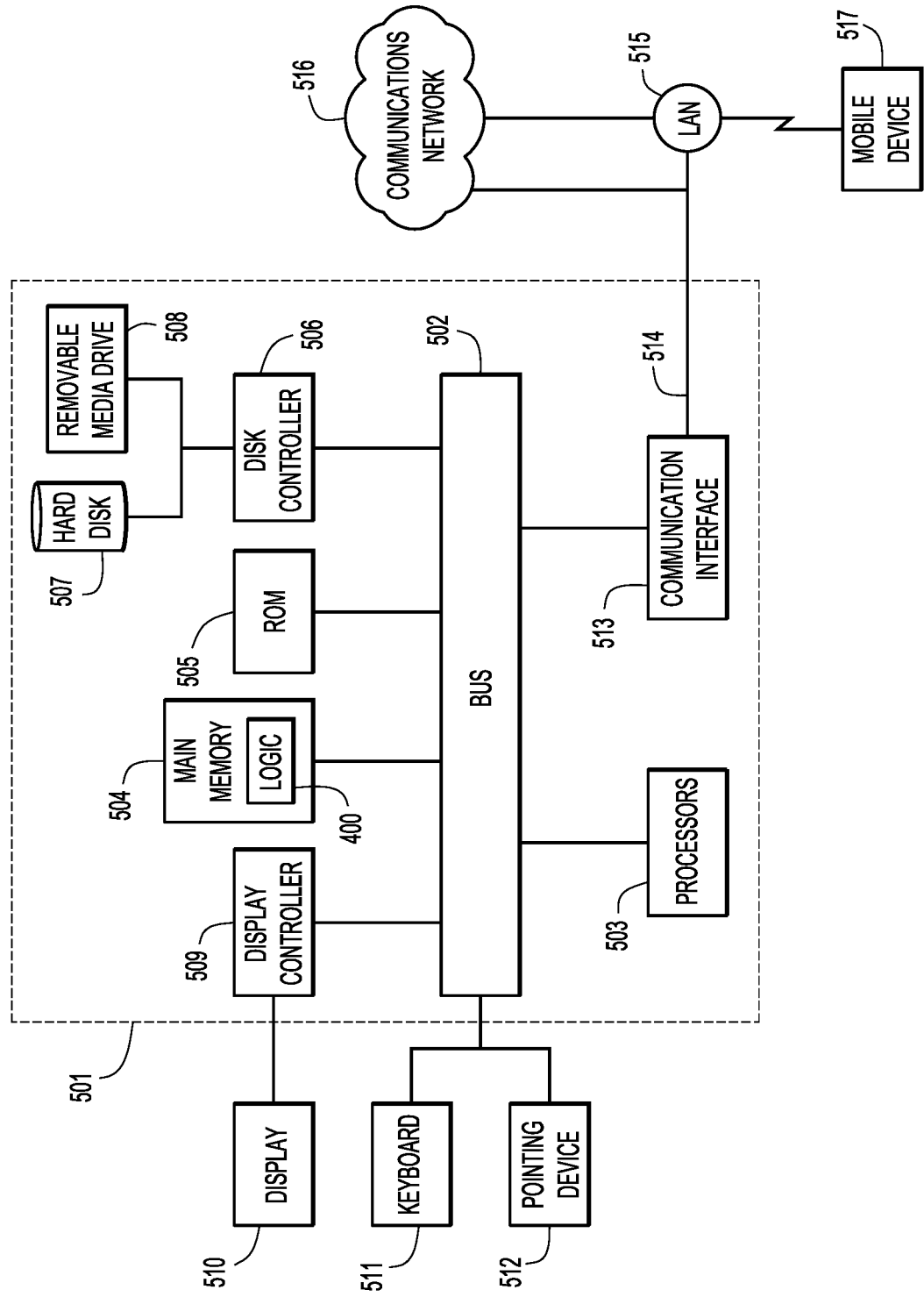
FIG. 5 depicts a device (e.g., a BMC) on which the several described embodiments may be implemented.

FIG. 5 depicts a device (e.g., a BMC 150 and associated a motherboard of a physical server 120) on which the described embodiments may be implemented).

The device may be implemented on or as a computer system 901 (e.g., a server 120). The computer system 501 may be programmed to implement a computer based device. The computer system 501 includes a bus 502 or other communication mechanism for communicating information, and a processor 503 coupled with the bus 502 for processing the information. While the figure shows a single block 503 for a processor, it should be understood that the processor 503 represents a plurality of processors or processing cores, each of which can perform separate processing. The computer system 501 may also include a main memory 504, such as a random access memory (RAM) or other dynamic storage device (e.g., dynamic RAM (DRAM), static RAM (SRAM), and synchronous DRAM (SD RAM)), coupled to the bus 502 for storing information and instructions (e.g., BMC logic 400) to perform the operations described herein and to be executed by processor 503. In addition, the main memory 504 may be used for storing temporary variables or other intermediate information during the execution of instructions by the processor 503.

The computer system 501 may further include a read only memory (ROM) 505 or other static storage device (e.g., programmable ROM (PROM), erasable PROM (EPROM), and electrically erasable PROM (EEPROM)) coupled to the bus 502 for storing static information and instructions for the processor 503.

The computer system 501 may also include a disk controller 506 coupled to the bus 502 to control one or more storage devices for storing information and instructions, such as a magnetic hard disk 507, and a removable media drive 508 (e.g., floppy disk drive, read-only compact disc drive, read/write compact disc drive, compact disc jukebox, tape drive, and removable magneto-optical drive). The storage devices may be added to the computer system 501 using an appropriate device interface (e.g., small computer system interface (SCSI), integrated device electronics (IDE), enhanced-IDE (E-IDE), direct memory access (DMA), or ultra-DMA).

The computer system 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 501 may also include a display controller 509 coupled to the bus 502 to control a display 510, such as a cathode ray tube (CRT) or liquid crystal display (LCD), for displaying information to a computer user. The computer system 501 may include input devices, such as a keyboard 511 and a pointing device 512, for interacting with a computer user and providing information to the processor 503. The pointing device 512, for example, may be a mouse, a trackball, or a pointing stick for communicating direction information and command selections to the processor 503 and for controlling cursor movement on the display 510. In addition, a printer may provide printed listings of data stored and/or generated by the computer system 501.

The computer system 501 performs a portion or all of the processing operations of the embodiments described herein in response to the processor 503 executing one or more sequences of one or more instructions contained in a memory, such as the main memory 504. Such instructions may be read into the main memory 504 from another computer readable medium, such as a hard disk 507 or a removable media drive 508. One or more processors in a multi-processing arrangement may also be employed to execute the sequences of instructions contained in main memory 504. In alternative embodiments, hard-wired circuitry may be used in place of or in combination with software instructions. Thus, embodiments are not limited to any specific combination of hardware circuitry and software.

As stated above, the computer system 501 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 501, for driving a device or devices for implementing the described embodiments, and for enabling the computer system 501 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 501 also includes a communication interface 513 coupled to the bus 502. The communication interface 513 provides a two-way data communication coupling to a network link 514 that is connected to, for example, a local area network (LAN) 515, or to another communications network 516. For example, the communication interface 513 may be a wired or wireless network interface card or modem (e.g., with SIM card) configured to attach to any packet switched (wired or wireless) LAN or WWAN. As another example, the communication interface 513 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 513 sends and receives electrical, electromagnetic or optical signals that carry digital data streams representing various types of information.

The network link 514 typically provides data communication through one or more networks to other data devices. For example, the network link 514 may provide a connection to another computer through a local area network 515 (e.g., a LAN) or through equipment operated by a service provider, which provides communication services through a communications network 516. The local network 514 and the communications network 516 use, for example, electrical, electromagnetic, or optical signals that carry digital data streams, and the associated physical layer (e.g., CAT 5 cable, coaxial cable, optical fiber, etc.). The signals through the various networks and the signals on the network link 514 and through the communication interface 513, which carry the digital data to and from the computer system 501 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 501 can transmit and receive data, including program code, through the network(s) 515 and 516, the network link 514 and the communication interface 513. Moreover, the network link 514 may provide a connection to a mobile device 517 such as a personal digital assistant (PDA) laptop computer, cellular telephone, or modem and SIM card integrated with a given device.

In summary, in one form, a method is provided. The method includes sending, from a first baseboard management controller (BMC), to other BMCs in a network, a first message indicating a desire to establish a master-slave relationship; receiving a response from a second BMC from among the other BMCs, the response indicating an ability to function as a master in the master-slave relationship; sending, from the first BMC, a second message to the second BMC confirming establishment of the master-slave relationship between the second BMC and the first BMC; sending, from the first BMC to the second BMC, a request for configuration information; and in response to the request for configuration information, receiving, from the second BMC, configuration profile data representative of a configuration of a server, which is controlled by the second BMC.

In an embodiment, the first message comprises an indication of a firmware version of the first BMC, a hardware inventory summary of a server controlled by the first BMC, and an indication of a tree level position of the first BMC in a logical hierarchy of BMCs including the first BMC and the other BMCs.

The may further comprise receiving the response from the second BMC when the second BMC determines a compatibility between the first BMC and the second BMC based on the firmware version of the first BMC, the hardware inventory summary of a server controlled by the first BMC, and the indication of a tree level position of the first BMC.

The method may include the first BMC updating its own configuration data in accordance with the configuration profile data representative of the configuration of the server, which is controlled by the second BMC.

The method may also include the first BMC periodically sending a heartbeat message to the second BMC.

The method may still further include the first BMC functioning as a master with respect to a third BMC from among the other BMCs.

In an embodiment, the first BMC, the second BMC and the third BMC are part of a same subnet.

The method may include the first BMC receiving a firmware update message from the second BMC, and updating firmware in the first BMC in accordance with the firmware update message.

The method may still further include receiving from the second BMC an inquiry message, which requests information about at least one of power usage or processor usage, and the first BMC responding to the second BMC with the information about at least one of power usage or processor usage.

And the method may also include the first BMC receiving seed data from a cloud service application, and proliferating the seed data to the second BMC.

In another form, a device may also be provided in accordance with an embodiment. The device may include an interface unit configured to enable network communications, a memory, and one or more processors coupled to the interface unit and the memory, and configured to: send, from a first baseboard management controller (BMC), to other BMCs in a network, a first message indicating a desire to establish a master-slave relationship; receive a response from a second BMC from among the other BMCs, the response indicating an ability to function as a master in the master-slave relationship; send, from the first BMC, a second message to the second BMC confirming establishment of the master-slave relationship between the second BMC and the first BMC; send, from the first BMC to the second BMC, a request for configuration information; and in response to the request for configuration information, receive, from the second BMC, configuration profile data representative of a configuration of a server, which is controlled by the second BMC.

In an embodiment, the first message comprises an indication of a firmware version of the first BMC, a hardware inventory summary of a server controlled by the first BMC, and an indication of a tree level position of the first BMC in a logical hierarchy of BMCs including the first BMC and the other BMCs.

The one or more processors may be configured to receive the response from the second BMC when the second BMC determines a compatibility between the first BMC and the second BMC based on the firmware version of the first BMC, the hardware inventory summary of a server controlled by the first BMC, and the indication of a tree level position of the first BMC.

The one or more processors may also be configured to update the configuration data on the first BMC in accordance with the configuration profile data representative of the configuration of the server, which is controlled by the second BMC.

The one or more processors may be configured to periodically send, from the first BMC, a heartbeat message to the second BMC.

The one or more processors may be configured to enable the first BMC to function as a master with respect to a third BMC from among the other BMCs.

In still another form, a non-transitory computer readable storage media is provided that is encoded with instructions that, when executed by a processor, cause the processor to perform operations including: send, from a first baseboard management controller (BMC), to other BMCs in a network, a first message indicating a desire to establish a master-slave relationship; receive a response from a second BMC from among the other BMCs, the response indicating an ability to function as a master in the master-slave relationship; send, from the first BMC, a second message to the second BMC confirming establishment of the master-slave relationship between the second BMC and the first BMC; send, from the first BMC to the second BMC, a request for configuration information; and in response to the request for configuration information, receive, from the second BMC, configuration profile data representative of a configuration of a server, which is controlled by the second BMC.

In an embodiment, the first message comprises an indication of a firmware version of the first BMC, a hardware inventory summary of a server controlled by the first BMC, and an indication of a tree level position of the first BMC in a logical hierarchy of BMCs including the first BMC and the other BMCs.

The instructions may further include instructions that, when executed by a processor, cause the processor to receive the response from the second BMC when the second BMC determines a compatibility between the first BMC and the second BMC based on the firmware version of the first BMC, the hardware inventory summary of a server controlled by the first BMC, and the indication of a tree level position of the first BMC.

The instructions may further include instruction that, when executed by a processor, cause the processor to update the configuration data on the first BMC in accordance with the configuration profile data representative of the configuration of the server, which is controlled by the second BMC.

The above description is intended by way of example only. Various modifications and structural changes may be made therein without departing from the scope of the concepts described herein and within the scope and range of equivalents of the claims.

What is claimed is:

1. A method comprising:
    sending, from a first baseboard management controller (BMC), to other BMCs in a network, a first message indicating a desire to establish a master-slave relationship;
    receiving a response from a second BMC from among the other BMCs, the response indicating an ability of the second BMC to function as a master in the master-slave relationship;
    sending, from the first BMC, a second message to the second BMC confirming establishment of the master-slave relationship between the second BMC and the first BMC;
    sending, from the first BMC to the second BMC, a request for configuration information; and
    in response to the request for configuration information, receiving, from the second BMC, configuration profile data representative of a configuration of a server, which is controlled by the second BMC,
    wherein the first BMC functions as a master with respect to a third BMC from among the other BMCs while also simultaneously functioning as a slave with respect to the second BMC.

2. The method of claim 1, wherein the first message comprises an indication of a firmware version of the first BMC, a hardware inventory summary of a server controlled by the first BMC, and an indication of a tree level position of the first BMC in a logical hierarchy of BMCs including the first BMC and the other BMCs.

3. The method of claim 2, further comprising receiving the response from the second BMC when the second BMC determines a compatibility between the first BMC and the second BMC based on the firmware version of the first BMC, the hardware inventory summary of a server controlled by the first BMC, and the indication of a tree level position of the first BMC.

4. The method of claim 1, further comprising the first BMC updating its own configuration data in accordance with the configuration profile data representative of the configuration of the server, which is controlled by the second BMC.

5. The method of claim 1, further comprising the first BMC periodically sending a heartbeat message to the second BMC.

6. The method of claim 1, wherein the first BMC, the second BMC and the third BMC are part of a same subnet.

7. The method of claim 1, further comprising the first BMC receiving a firmware update message from the second BMC, and updating firmware in the first BMC in accordance with the firmware update message.

8. The method of claim 1, further comprising receiving from the second BMC an inquiry message, which requests information about at least one of power usage or processor usage, and the first BMC responding to the second BMC with the information about at least one of power usage or processor usage.

9. The method of claim 1, further comprising the first BMC receiving seed data from a cloud service application, and proliferating the seed data to the second BMC.

10. A device comprising:
    a network interface configured to enable network communications;
    a memory; and
    one or more processors coupled to the network interface and the memory, and configured to:
        send, from a first baseboard management controller (BMC), to other BMCs in a network, a first message indicating a desire to establish a master-slave relationship;
        receive a response from a second BMC from among the other BMCs, the response indicating an ability of the second BMC to function as a master in the master-slave relationship;
        send, from the first BMC, a second message to the second BMC confirming establishment of the master-slave relationship between the second BMC and the first BMC;
        send, from the first BMC to the second BMC, a request for configuration information; and
        in response to the request for configuration information, receive, from the second BMC, configuration profile data representative of a configuration of a server, which is controlled by the second BMC,
        wherein the first BMC functions as a master with respect to a third BMC from among the other BMCs while also simultaneously functioning as a slave with respect to the second BMC.

11. The device of claim 10, wherein the first message comprises an indication of a firmware version of the first BMC, a hardware inventory summary of a server controlled by the first BMC, and an indication of a tree level position of the first BMC in a logical hierarchy of BMCs including the first BMC and the other BMCs.

12. The device of claim 11, wherein the one or more processors are configured to receive the response from the second BMC when the second BMC determines a compatibility between the first BMC and the second BMC based on the firmware version of the first BMC, the hardware inventory summary of a server controlled by the first BMC, and the indication of a tree level position of the first BMC.

13. The device of claim 10, wherein the one or more processors are configured to update the configuration data on the first BMC in accordance with the configuration profile data representative of the configuration of the server, which is controlled by the second BMC.

14. The device of claim 10, wherein the one or more processors are configured to periodically send, from the first BMC, a heartbeat message to the second BMC.

15. A non-transitory computer readable storage media encoded with instructions that, when executed by a processor, cause the processor to:
    send, from a first baseboard management controller (BMC), to other BMCs in a network, a first message indicating a desire to establish a master-slave relationship;
    receive a response from a second BMC from among the other BMCs, the response indicating an ability of the second BMC to function as a master in the master-slave relationship;

send, from the first BMC, a second message to the second BMC confirming establishment of the master-slave relationship between the second BMC and the first BMC;

send, from the first BMC to the second BMC, a request for configuration information; and in response to the request for configuration information, receive, from the second BMC, configuration profile data representative of a configuration of a server, which is controlled by the second BMC, wherein the first BMC functions as a master with respect to a third BMC from among the other BMCs while also simultaneously functioning as a slave with respect to the second BMC.

16. The non-transitory computer readable storage media of claim 15, wherein the first message comprises an indication of a firmware version of the first BMC, a hardware inventory summary of a server controlled by the first BMC, and an indication of a tree level position of the first BMC in a logical hierarchy of BMCs including the first BMC and the other BMCs.

17. The non-transitory computer readable storage media of claim 16, further including instructions that, when executed by a processor, cause the processor to receive the response from the second BMC when the second BMC determines a compatibility between the first BMC and the second BMC based on the firmware version of the first BMC, the hardware inventory summary of a server controlled by the first BMC, and the indication of a tree level position of the first BMC.

18. The non-transitory computer readable storage media of claim 15, further including instructions that, when executed by a processor, cause the processor to update the configuration data on the first BMC in accordance with the configuration profile data representative of the configuration of the server, which is controlled by the second BMC.

* * * * *